Dec. 15, 1953     H. R. MILAN ET AL     2,662,257
FISH STRINGER
Filed March 11, 1952
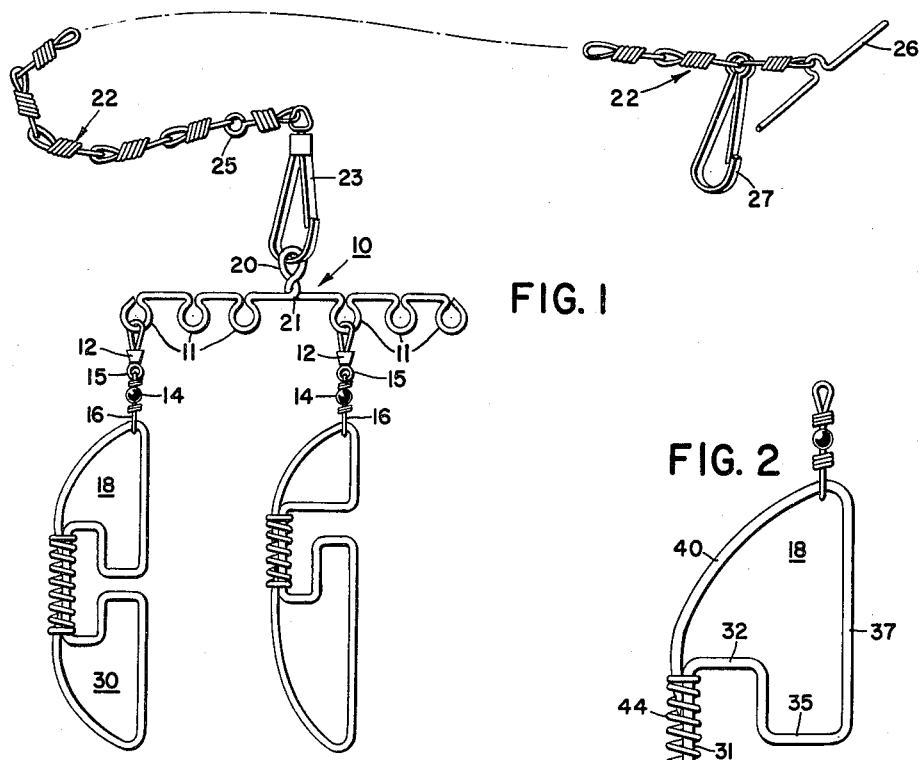
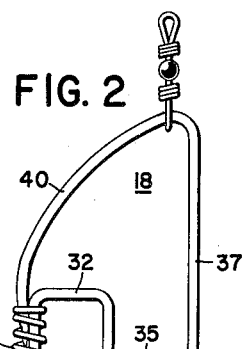
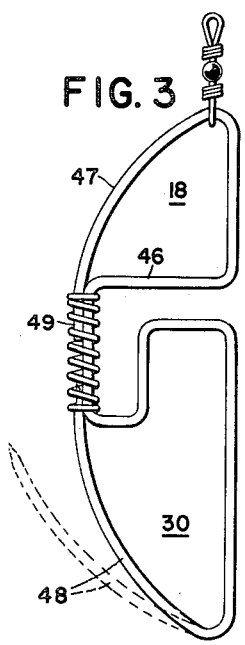
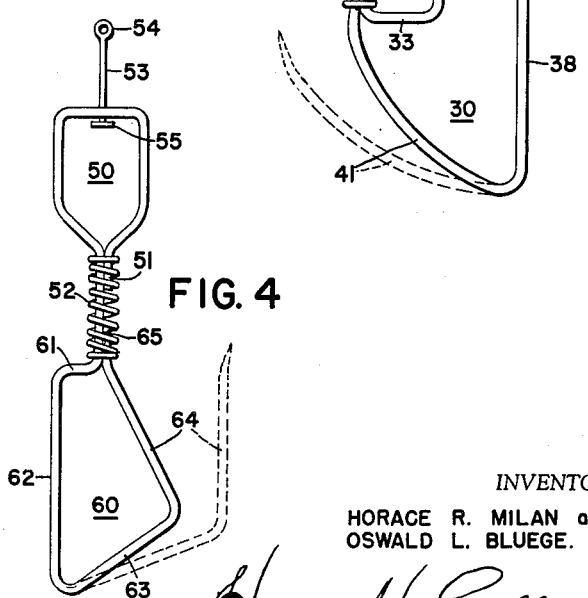
INVENTOR
HORACE R. MILAN and
OSWALD L. BLUEGE.
BY *Henry H. Snelling*
ATTORNEY Patented Dec. 15, 1953

2,662,257

UNITED STATES PATENT OFFICE 2,662,257

FISH STRINGER

Horace Robert Milan and Oswald L. Bluege, Washington, D. C.

Application March 11, 1952, Serial No. 275,866

1 Claim. (Cl. 24—73)

This invention relates to fish stringers and has for its principal object the provision of a particularly efficient stringer composed of a series of independent fish holders in spaced relation on a spreader detachably secured to a length of chain having at or near its free end holding devices for fastening the fish stringer assembly to a portion of a boat while fishing and for transporting the catch.

An important feature of the invention is the individual holder, each in the preferred form consisting of a narrow central section connecting two bays or loops, one loop being swiveled to the wire spreader and the other including a free end normally ready to open to receive the fish but resiliently movable toward the central portion where the free end is caught in a cylindrical retainer, preferably formed by a simple coil of wire and expanding to lie between the barrier bends of the central portion joining the two loops.

The holders are extremely easy to use as the spring coil of wire may be only slightly larger than the diameter of the wire, as the free ends of the wires are pointed and when the hook end is bent toward the central portion the needle-like point of the hook penetrates within the coil of the spring and by its resilience pulls the end of the spring firmly against the bottom of the central portion. The amount of latching is quite small, because of the pointed ends, and as a consequence, the amount of movement of the spring coil to release either end is also quite small.

In the drawings:

Figure 1 is a view of the complete stringer;

Figure 2 is a view of one of the double holders;

Figure 3 is a view of a single fish holder;

Figure 4 is a modification.

The spreader 10 may be formed of a single piece of wire bent into a number of spaced rings 11, each of which may receive a safety-pin type retainer 12, carrying a double swivel connection 14 having eyes 15 and 16, the latter fitting loosely one loop 18 of the holder. A securing ring 20 centrally of the spreader 10 is formed by twisting the wire of the spreader as at 21. The spreader 10 is joined to the chain 22 by means of a clasp 23 and figure 8 swivel link 25. The free end of the chain may carry a handle piece 26 of any desired type, and near this handle the usual snap fastener 27.

Referring particularly to Figure 2, the holder consists of a single piece of wire, one end portion of which is bent to form the loop 18 and the other end portion forming the other or second loop 30. Between the loops 18 and 30 there is a central portion 31, the two margins of which are formed by the bends 32 and 33, which form parts of the two loops. The configuration of the bight thus formed between the two equal sized loops 18 and 30 is a T, the portion 31 being the top of the head of the T, the bends 32 and 33 forming the sides of the head, and the sides 35 and 36 forming the stem of the T. The loop sides 37 and 38 are conveniently alined and the curved outside portions 40 and 41 terminate parallel to the central portion 31 and well short of each other. Both wire ends may be pointed and both free, or the terminal 40 may be permanently secured to the portion 31, thus making loop 18 a mere closed link. The beveled or otherwise pointed terminals of hook portions 40 and 41 are resiliently held quite far away from the central portion 31, the more conveniently to facilitate stringing the caught fish. These terminals when bent into parallelism with the central portion 31 may be restrained by a latch of a coil spring of wire 44, loosely expanded to engage both of the two free ends of the wire. A gentle pressure axially on either end of the spring 44 will free the opposite hook terminal 40 or 41 and allow it to open wide.

When both pointed terminals are free at the same time, the spring 44 is quite loose on central portion 31 and is shorter than the distance between the barrier bends 32 and 33. When one hook is free, the pointed end of the other hook anchors the spring to the portion 31, just about centrally thereof so a very slight lateral movement of the spring end is necessary to latch the one hook that was free, or to release either when both are latched.

In Figure 3 a slightly modified form is shown, this being the so-called single type. In this form the sides 32 and 35 are replaced by a single arm 46, which, with the arcuate strands 47 and 48 form an attaching loop. Since this attaching loop will only be opened quite rarely the terminal end 49 is provided with a chisel point and this may penetrate appreciably further into the spring 44, than does either needle point of the preferred form shown in Figure 2.

In Figure 4, a lighter form of holder is shown. In this modification the attaching loop 50 is entirely closed. The terminal end 51 being soldered or otherwise secured to the central portion here numbered 52. A pin 53 has an eye 54 at one end and a head 55 at the other end, so that the pin is swiveled in the closed loop. The attaching loop 60 is formed by a side 61 corresponding to 36 but in this case raising the central section into alinement with the pin 53. The straight side 62 of loop 60 is preferably alined with a side of loop 60. The side 63 makes an angle of about 60° with the side 62, and makes a right angle with the hook side 64, the latter having a slightly bent terminal 65, corresponding exactly to the needle point end of the hook side 41 in the preferred type.

What we claim is:

A holder unit to be secured with similar units to the spreader of a fish stringer, comprising a single strip of resilient wire bent into two spaced loops of equal size, symmetrically positioned with respect to a bight of a hollow T-shape, the head of the T being the central portion of the wire as well as the central portion of the holder unit, forming the sole connection between the two loops, the sides of the stem of the T being spaced apart, each loop including a part of the head of the T, one side of the stem of the T, and a relatively long outside portion curving from the bottom edge of the holder unit up to the top of the T when said portion is in normal position, the end of each outside portion forming a fish impaling hook, said end lying parallel to the head of the T, and latching means movable on said central portion adapted to surround and thereby latch the hook ends of the loops to said central portion to hold the end in said normal position whereby as either loop, empty or having a fish in it, is held in the palm of the fisherman's hand, the thumb and the forefinger of that hand may release the latched end of the opposite loop to allow the outside portion to spring clear of the head of the T for convenient impaling of a fish held in the fisherman's other hand.

HORACE ROBERT MILAN.
OSWALD L. BLUEGE.

References Cited in the file of this patent
UNITED STATES PATENTS

| Number | Name | Date |
|---|---|---|
| 312,105 | Faivre | Feb. 10, 1885 |
| 1,237,817 | Ringle | Aug. 21, 1917 |
| 2,155,987 | Assaf | Apr. 25, 1939 |